(12) United States Patent
Lin

(10) Patent No.: US 10,814,548 B2
(45) Date of Patent: Oct. 27, 2020

(54) ADDITIVE MANUFACTURING METHOD

(71) Applicant: National Chung Cheng University, Chiayi (TW)

(72) Inventor: Pai-Chen Lin, Chiayi (TW)

(73) Assignee: National Chung Cheng University, Chiayi (TW)

( * ) Notice: Subject to any disclaimer, the term of this patent is extended or adjusted under 35 U.S.C. 154(b) by 29 days.

(21) Appl. No.: 16/230,236

(22) Filed: Dec. 21, 2018

(65) Prior Publication Data
US 2020/0016825 A1 Jan. 16, 2020

(30) Foreign Application Priority Data
Jul. 16, 2018 (TW) .............................. 107124508 A

(51) Int. Cl.
| | |
|---|---|
| *B23K 20/12* | (2006.01) |
| *B29C 64/147* | (2017.01) |
| *B33Y 10/00* | (2015.01) |
| *B22F 1/00* | (2006.01) |
| *B33Y 70/00* | (2020.01) |
| *B33Y 30/00* | (2015.01) |

(52) U.S. Cl.
CPC .......... *B29C 64/147* (2017.08); *B22F 1/0003* (2013.01); *B23K 20/12* (2013.01); *B33Y 10/00* (2014.12); *B33Y 30/00* (2014.12); *B33Y 70/00* (2014.12)

(58) Field of Classification Search
CPC .......................................... B23K 20/12–1295
USPC ............................... 228/112.1–114.5, 2.1–2.3
See application file for complete search history.

(56) References Cited

U.S. PATENT DOCUMENTS

| | | | |
|---|---|---|---|
| 2006/0124701 A1* | 6/2006 | Chen ................... | B23K 20/125 228/112.1 |
| 2009/0068492 A1* | 3/2009 | Fujii ..................... | B23K 9/173 428/615 |
| 2010/0092789 A1* | 4/2010 | Heck ..................... | B32B 15/14 428/457 |

(Continued)

FOREIGN PATENT DOCUMENTS

| | | |
|---|---|---|
| CN | 105171229 A | 12/2015 |
| CN | 106112254 A | 11/2016 |

(Continued)

OTHER PUBLICATIONS

Search Report appended to an Office Action, which was issued to Taiwanese counterpart application No. 107124508 by the TIPO dated Jul. 17, 2019, with an English translation thereof.

*Primary Examiner* — Kiley S Stoner
(74) *Attorney, Agent, or Firm* — TraskBritt

(57) ABSTRACT

An additive manufacturing method includes: providing a metal substrate; pressing a plurality of first metal parts to weld the same on the metal substrate one by one using a welding unit through friction welding so as to form a first stacked layer laminated on the metal substrate; pressing a plurality of second metal parts to weld the same on the first stacked layer one by one using the welding unit through friction welding so as to form a second stacked layer laminated on the first stacked layer; and repeating formation of the second stacked layer until a required amount of the second stacked layers are additively laminated on the first stacked layer to obtain a final three-dimensional (3D) article.

12 Claims, 10 Drawing Sheets

(56) References Cited

U.S. PATENT DOCUMENTS

| | | | | |
|---|---|---|---|---|
| 2011/0076419 A1* | 3/2011 | Yang | B23K 20/1275 | 427/554 |
| 2011/0293840 A1* | 12/2011 | Newkirk | B23K 20/1255 | 427/367 |
| 2012/0202089 A1* | 8/2012 | Hangai | B32B 15/01 | 428/613 |
| 2014/0220372 A1* | 8/2014 | Heck | B32B 15/14 | 428/594 |
| 2015/0290711 A1* | 10/2015 | Norfolk | B23K 20/103 | 425/78 |
| 2016/0129670 A1* | 5/2016 | Mochizuki | F28F 3/12 | 361/679.01 |
| 2017/0209954 A1* | 7/2017 | Kato | C22C 30/00 | |
| 2017/0304933 A1* | 10/2017 | Miles | B23K 20/128 | |
| 2017/0326681 A1* | 11/2017 | Sidhu | C22F 1/183 | |
| 2018/0250739 A1* | 9/2018 | Saurwalt | B22F 1/0074 | |
| 2018/0272460 A1* | 9/2018 | Nelson | C22B 15/01 | |
| 2018/0339338 A1* | 11/2018 | Hofmann | B33Y 80/00 | |
| 2018/0345427 A1* | 12/2018 | Boker | B21D 28/22 | |
| 2018/0369954 A1* | 12/2018 | Sugimoto | C23C 28/30 | |
| 2019/0001414 A1* | 1/2019 | Konyashin | B22F 3/1055 | |
| 2019/0120574 A1* | 4/2019 | Stenqvist | B23K 35/0233 | |
| 2019/0126384 A1* | 5/2019 | Polewarczyk | B23K 20/1255 | |
| 2019/0134756 A1* | 5/2019 | Mann | B23K 35/005 | |
| 2019/0134918 A1* | 5/2019 | Van Tooren | B29C 66/9221 | |
| 2019/0193194 A1* | 6/2019 | Grong | B23K 20/1245 | |
| 2019/0210147 A1* | 7/2019 | Karvinen | B23K 20/1205 | |
| 2019/0329355 A1* | 10/2019 | Gradl | B23K 15/0093 | |
| 2019/0331058 A1* | 10/2019 | Gradl | B32B 1/08 | |
| 2019/0337052 A1* | 11/2019 | Baker | B22F 3/1039 | |
| 2019/0337232 A1* | 11/2019 | Prabha Narra | G06F 30/23 | |
| 2020/0078862 A1* | 3/2020 | Ehrstrom | B22F 7/04 | |

FOREIGN PATENT DOCUMENTS

| | | | | |
|---|---|---|---|---|
| DE | 102009059270 A1 * | 6/2011 | | B23K 35/0288 |
| EP | 2987584 A1 * | 2/2016 | | F28F 3/12 |
| EP | 3166211 A1 * | 5/2017 | | H02K 3/51 |
| KR | 101429854 B1 * | 8/2014 | | |
| WO | WO-2018007770 A2 * | 1/2018 | | B23P 15/00 |

* cited by examiner

ADDITIVE MANUFACTURING METHOD

CROSS-REFERENCE TO RELATED APPLICATION

This application claims priority to Taiwanese Invention Patent Application No. 107124508, filed on Jul. 16, 2018.

FIELD

The disclosure relates to an additive manufacturing method, and more particularly to an additive manufacturing method for welding metal parts on a metal substrate using friction welding techniques.

BACKGROUND

A conventional three-dimensional (3D) metal printing process for making solid three-dimensional (3D) metal parts involves distributing a metallic powder layer on a substrate, selectively sintering particles of the metallic powder layer using a laser to form a solid metal layer having a predetermined geometry, and repeating the distributing and sintering steps to additively build up the solid 3D metal parts.

However, for rapid sintering of the particles of each of the metallic powder layers, the machining environment for performing the conventional metal 3D printing process is required to be kept at a high temperature slightly lower than a sintering temperature of the particles of each of the metallic powder layers, and use of the laser is energy-consuming. Moreover, after the sintering is completed, residual stress remaining in the conventional solid 3D metal parts will adversely affect structural strength and service life thereof, and an annealing treatment is required to remove the residual stress, which further increases energy consumption.

SUMMARY

Therefore, an object of the disclosure is to provide an additive manufacturing method that can alleviate at least one of the drawbacks of the prior art.

According to the disclosure, an additive manufacturing method includes:

(a) providing a metal substrate for disposing a plurality of first metal parts;

(b) disposing one of the first metal parts on the metal substrate using a feeding unit movable relative to the metal substrate;

(c) pressing the one of the first metal parts using a welding unit that has a longitudinal axis and rotates about the longitudinal axis to make a pushing surface of the welding unit abut against a pressured surface of the one of the first metal parts opposite to the metal substrate and the one of the first metal parts be welded on the metal substrate through plastic deformation of a first joint zone between the metal substrate and the one of the first metal parts which results from heat generated by friction between the pressured surface of the one of the first metal parts and the pushing surface of the welding unit;

(d) repeating Steps (b) and (c) until a remainder of the first metal parts are welded on the metal substrate to form a first stacked layer laminated on the metal substrate;

(e) disposing one of second metal parts on the first stacked layer using the feeding unit;

(f) pressing the one of the second metal parts using the welding unit rotating about the longitudinal axis to make the pushing surface of the welding unit abut against a pressured surface of the one of the second metal parts facing away from the first stacked layer and the one of the second metal parts be welded on the first stacked layer through plastic deformation of a second joint zone between the first stacked layer and the one of the second metal parts which results from heat generated by friction between the pressured surface of the one of the second metal parts and the pushing surface of the welding unit;

(g) repeating Steps (e) and (f) until a remainder of the second metal parts are welded on the first stacked layer to form a second stacked layer laminated on the first stacked layer; and (h) repeating Step (g) until a required amount of the second stacked layers are additively laminated on the first stacked layer to obtain a final three-dimensional (3D) article.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
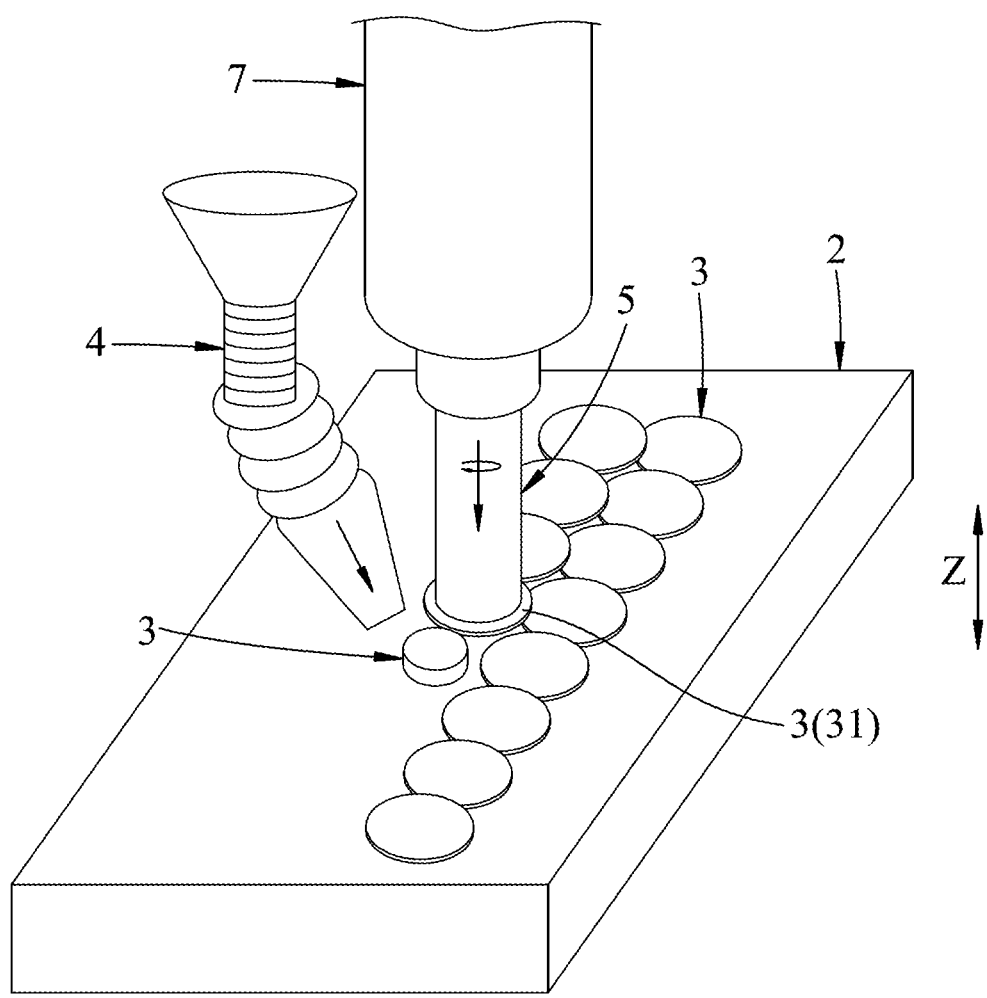
FIG. 1 is a perspective view illustrating laminating a first stacked layer on a metal substrate of an embodiment of an additive manufacturing method according to the disclosure.
Figure 2:
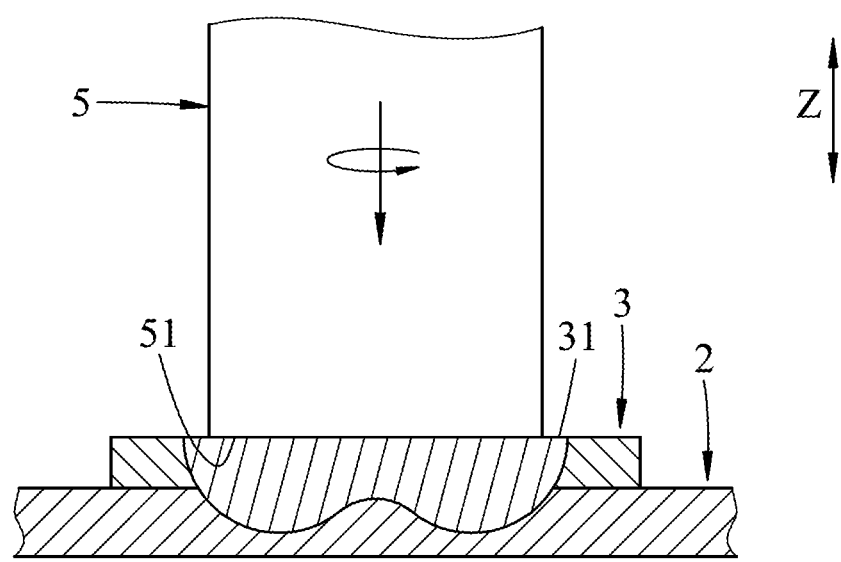
FIG. 2 is a fragmentary schematic view illustrating welding of one of first metal parts of the first stacked layer on the metal substrate.
Figure 3:
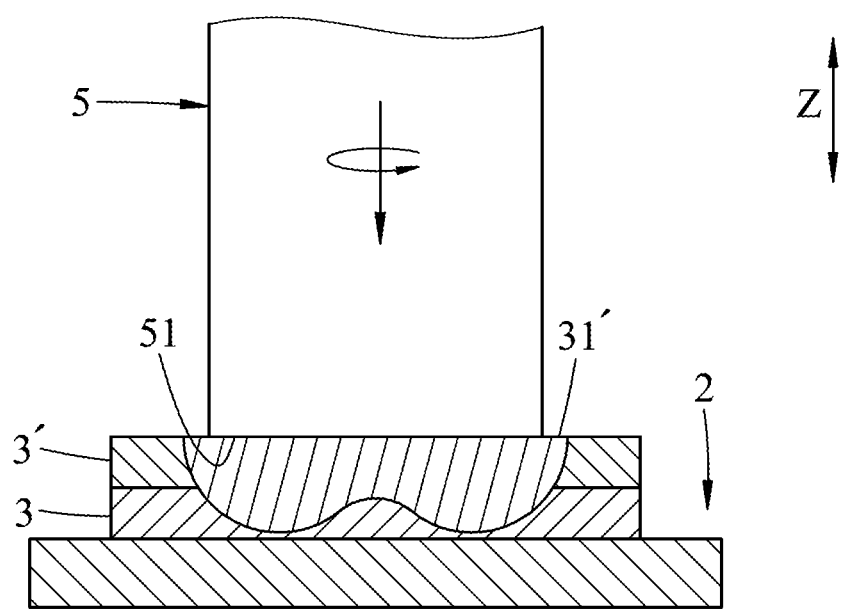
FIG. 3 is a fragmentary schematic view illustrating welding of one of second metal parts of a second stacked layer on the first stacked layer.
Figure 4:
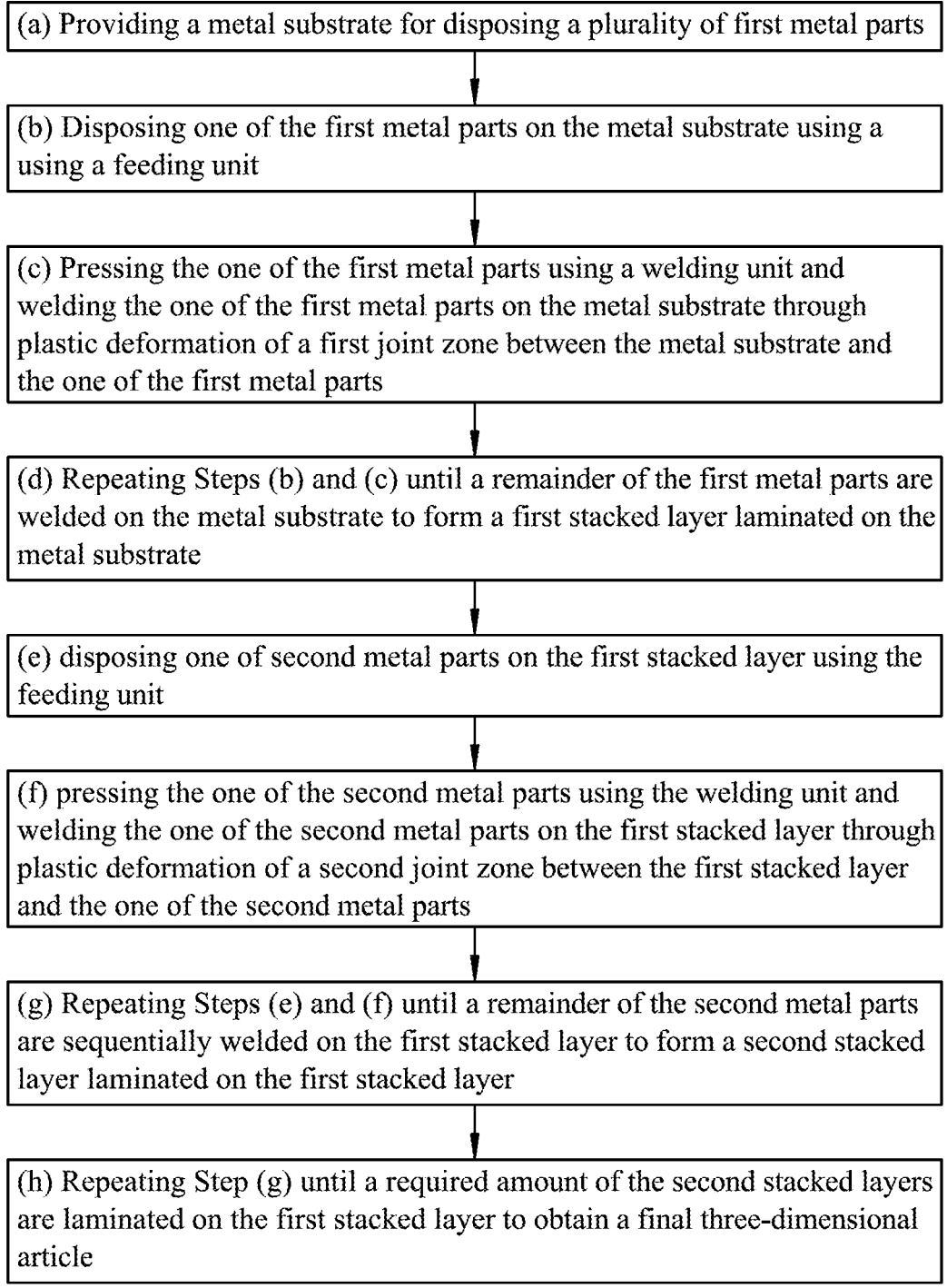
FIG. 4 is a flow chart illustrating consecutive steps of the embodiment of the additive manufacturing method.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 4, an embodiment of an additive manufacturing method according to the disclosure includes Steps (a) to (h).

In Step (a), a metal substrate 2 for disposing a plurality of first metal parts 3, a feeding unit 4, a welding unit 5 and a driving unit 7 used for performing the embodiment are provided.

In Step (b), one of the first metal parts 3 is disposed on the metal substrate 2 using the feeding unit 4 movable relative to the metal substrate 2.

In Step (c), the one of the first metal parts 3 is pressed using the welding unit 5 that has a longitudinal axis (Z) and is driven by the driving unit 7 to rotate about the longitudinal axis (Z) to make a pushing surface 51 of the welding unit 5 abut against a pressured surface 31 of the one of the first metal parts 3 opposite to the metal substrate 2 and the one of the first metal parts 3 be welded on the metal substrate 2 through plastic deformation of a first joint zone between the metal substrate 2 and the one of the first metal parts 3 which results from heat generated by friction between the pressured surface 31 of the one of the first metal parts 3 and the pushing surface 51 of the welding unit 5. Then, the welding unit 5 is removed from the one of the first metal parts 3 along the longitudinal axis (Z).

In Step (d), Steps (b) and (c) are repeated until a remainder of the first metal parts 3 are welded on the metal substrate 2 to form a first stacked layer laminated on the metal substrate 2.

In Step (e), one of second metal parts 3' is disposed on the first stacked layer using the feeding unit 4.

In Step (f), the one of the second metal parts 3' is pressed using the welding unit 5 rotating about the longitudinal axis (Z) to make the pushing surface 51 of the welding unit 5 abut against a pressured surface 31' of the one of the second metal parts 3' facing away from the first stacked layer and the one of the second metal parts 3' be welded on the first stacked layer through plastic deformation of a second joint zone between the first stacked layer and the one of the second metal parts 3' which results from heat generated by friction between the pressured surface 31' of the one of the second metal parts 3' and the pushing surface 51 of the welding unit 5. Then, the driving unit 7 is similarly removed from the one of the second metal parts 3' along the longitudinal axis (Z).

In Step (g), Steps (e) and (f) are repeated until a remainder of the second metal parts 3' are welded on the first stacked layer to form a second stacked layer laminated on the first stacked layer.

Figure 6:
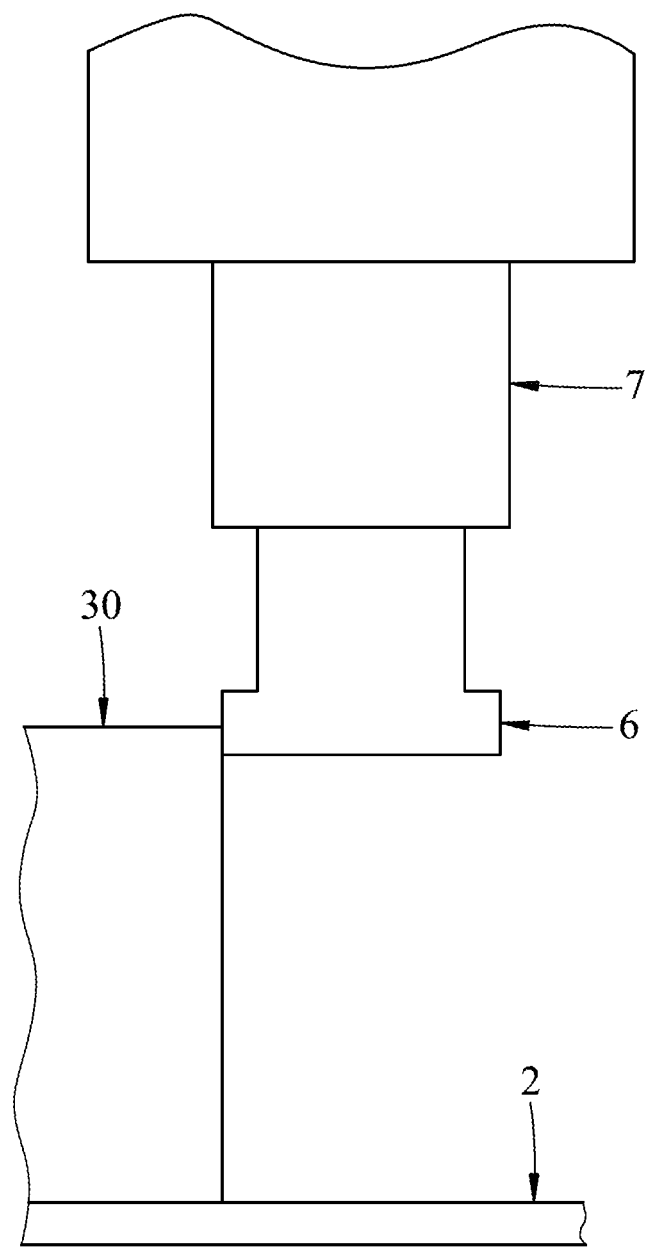
FIG. 6 is a fragmentary schematic view illustrating the embodiment that further includes a step of trimming the first and second stacked layers using a cutting unit.

In Step (h), Step (g) is repeated until a required amount of the second stacked layers are additively laminated on the first stacked layer to obtain a final three-dimensional (3D) article 30 (as shown in FIG. 6).

Figure 5:
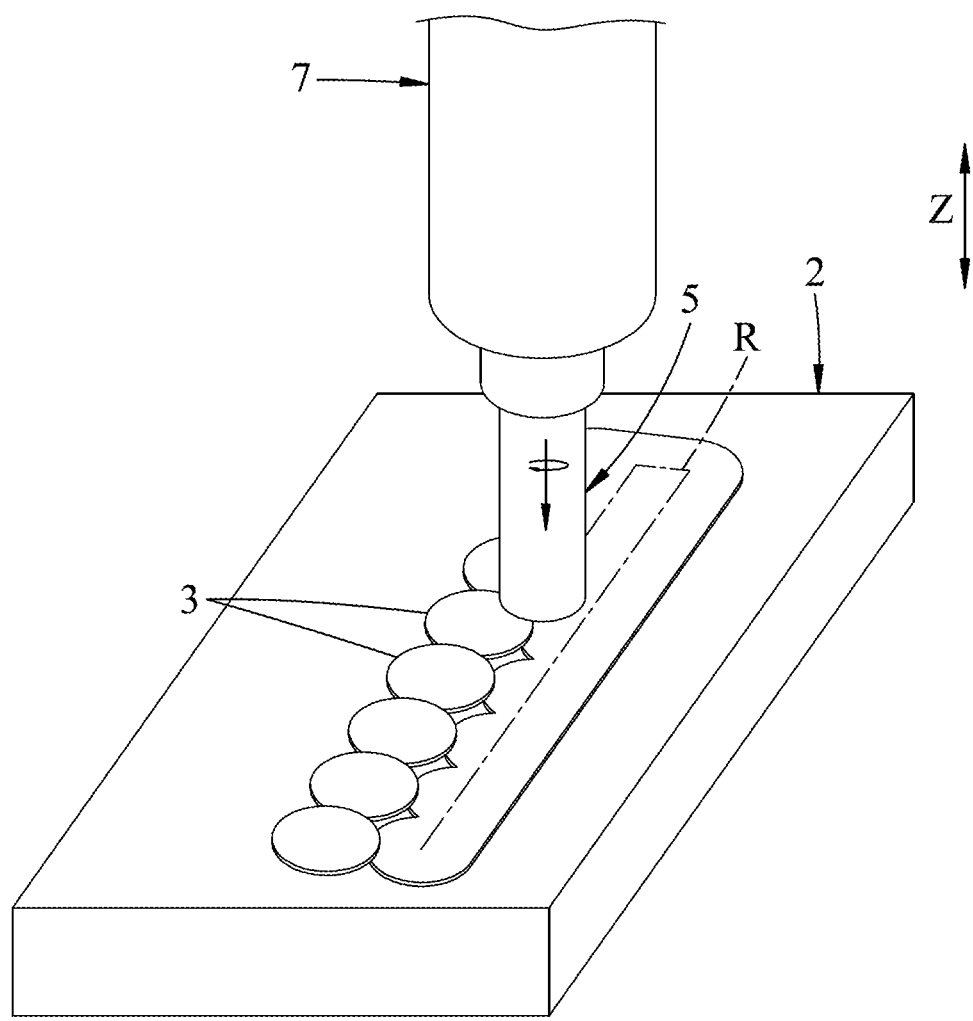
FIG. 5 is a perspective view illustrating the embodiment that further includes a step of pressing the first metal parts using a welding unit moving along a first reinforcing path.

Referring to FIG. 5, the embodiment of the additive manufacturing method may further include: after the first stacked layer is formed, pressing a top surface of the first stacked layer opposite to the metal substrate 2 using the welding unit 5 rotating about the longitudinal axis (Z), and moving the welding unit 5 along a first reinforcing path (R) on the first stacked layer. The first reinforcing path (R) passes through joint portions of the first stacked layer, each of the joint portions being formed between two adjacent ones of the first metal parts, and through a periphery of the first stacked layer. Similarly, the embodiment of the additive manufacturing method may further include: after each of the second stacked layer is formed, pressing a top surface of the second stacked layer facing away from the first stacked layer using the welding unit 5 rotating about the longitudinal axis (Z), and moving the welding unit 5 along a second reinforcing path on the second stacked layer. The second reinforcing path passes through joint portions of the second stacked layer, each of the joint portions being formed between two adjacent ones of the second metal parts 3', and through a periphery of the second stacked layer.

By way of moving the welding unit 5 along the first reinforcing path (R) on the first stacked layer and the second reinforcing path on each of the second stacked layers to proceed with reinforced friction welding for the first and second stacked layers, any gaps present among the first metal parts 3 or among the second metal parts 3' or any defects present in the first and second stacked layers can be removed, and thus improving the structural strength of the final 3D article 30.

Referring to FIG. 6, in the embodiment, the additive manufacturing method may further include trimming the first and second stacked layers after the first and second stacked layers are formed. By way of the trimming operation, the final 3D article 30 has a relatively smooth surface that provides a desirable appearance and safety in use.

Referring back to FIG. 1, in the embodiment, the welding unit 5 and the cutting unit 6 (as shown in FIG. 6) are installed in a tool magazine of a vertical computer numerical control (CNC) milling machine. A spindle unit of the vertical CNC milling machine serves as the driving unit 7 and includes a motor, a transmission shaft, and a jaw unit. When the additive manufacturing method of the disclosure is performed, depending upon the steps to proceed, one of the welding unit 5 and the cutting unit 6 is selected and removed from the tool magazine to be connected to the jaw unit of the driving unit 7. Then, the selected one of the welding unit 5 and the cutting unit 6 is driven to rotate by the driving unit 7. In addition, the metal substrate 2 is placed on a workbench of the vertical CNC milling machine, and the selected one of the welding unit 5 and the cutting unit 6 is driven by the driving unit 7 to move relative to the workbench to work on the metal substrate 2. The cutting unit 6 may be selected from an end mill or a face mill. The feeding unit may be a vibratory feeder. The vertical CNC milling machine may be selected from other machines having the same function. The feeding unit may have other configurations. Since the vertical CNC milling machine is well known to those skilled in the art, further details thereof are not provided herein for the sake of brevity.

Referring back to FIGS. 1, 3 and 4, in the embodiment, each of the first and second metal parts 3, 3' may be circular. Besides, when the welding unit 5 is driven to rotate about the longitudinal axis (Z) and presses one of the first metal parts 3 or one of the second metal parts 3', in addition to occurrence of the abovementioned plastic deformation of the first joint zone or the second joint zones, the pressure applied to the one of the first metal parts 3 or the one of the second metal parts 3' may prevent the same from offset. Alternatively, the pushing surface 51 of the welding unit 5 may be an embossed surface or a grooved surface so as to increase flowability of the plasticized first and second joint zones. Since formation of the embossed or grooved surface is well known to those skilled in the art, further details thereof are not provided herein for the sake of brevity.

Each of the first and second metal parts 3, 3' may be made of a metallic material having a melting point not higher than 1500° C. The metallic material may be selected from a metal, an alloy and a metal-containing composite. Specifically, the metallic material may be selected from the group consisting of steel, a copper-based alloy, an aluminum-based alloy, a magnesium-based alloy, a nickel-based alloy and combinations thereof. The aluminum-based alloy is selected from 1000 series aluminum alloys, 2000 series aluminum alloys, 5000 series aluminum alloys, 6000 series aluminum alloys or 7000 series aluminum alloys, but is not limited thereto. In certain embodiments, the magnesium-based alloy is AZ31 magnesium alloy, and the nickel-based alloy is nickel aluminum bronze, but are not limited thereto.

Compared with the conventional three-dimensional (3D) metal printing process, the method of the disclosure can be easily implemented and is cost-saving relative to sequential distribution of the metallic powder layers in the conventional 3D metal printing process. In addition, the vertical CNC milling machine is easily available and the energy consumption thereof is relatively low. Moreover, the working temperature for forming the first stacked layer laminated on the metal substrate 2 and the second stacked layers additively laminated on the first stacked layer, is lower than the melting point of the first and second metal parts 3, 3'.

Furthermore, each of the metal powder layers formed by the laser in the conventional 3D metal printing process has a thickness of not larger than 0.5 mm. Thus, when a large-scale 3D metal article is intended to be made, a considerable number of the metal powder layers are required. By contrast, each of the first and second metal parts 3, 3' may have a thickness measured along the longitudinal axis (Z) of less than 4 mm and greater than 0.5 mm. Thus, the same large-scale 3D metal article can be made by forming a relatively small number of the first and second stacked layers by using the additive manufacturing method of the disclosure. In addition, by way of the additive manufacturing method of the disclosure, the metal parts 3, 3' have a relatively larger size than that of the particles of the metallic powder layer in the conventional 3D metal printing process, and therefore greatly reduces the risk of accident that endangers public safety, such as dust pollution or dust explosion during the conventional 3D metal printing process.

Moreover, by using the welding unit 5 rotating about the longitudinal axis (Z), crystal grains present in the first and second joint zones can be refined, and the final 3D article 30 thus manufactured has a relatively great structural strength and service life, and the annealing treatment required by the conventional 3D metal printing process can be dispensed. Furthermore, the metal parts 3, 3' are deformed at relatively high temperature and high pressure. Thus, it is not necessary to conduct the additive manufacturing method of the disclosure in a vacuum environment or in an inert atmosphere, which is otherwise required for a conventional selective laser melting method.

Figure 7:
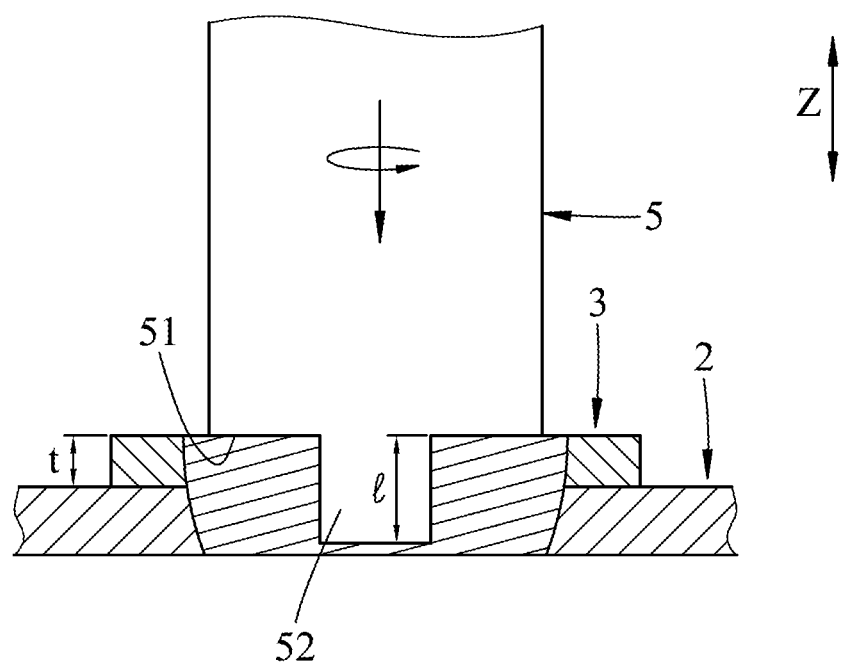
FIG. 7 is a fragmentary schematic view illustrating a modification of the welding unit used in the embodiment.

Referring to FIG. 7, a modification of the welding unit 5 of the embodiment of the additive manufacturing method is illustrated. In the modification, the welding unit 5 further includes a probe 52 protruding from the pushing surface 51 along the longitudinal axis (Z) and having a height (l) measured along the axis (Z) that is greater than the thickness (t) of each of the first metal parts 3. Similarly, the height (l) of the probe 52 may be greater than the thickness of each of the second metal parts 3'. Hence, when the pressured surface 31, 31' of the first and second metal parts 3, 3' are respectively pressed by the pushing surface 51 of the welding unit 5 rotating about the longitudinal axis (Z), the probe 52 will be capable of stirring the plasticized first and second joint zones and increasing the depth of each of the plasticized first and second joint zones along the longitudinal axis (Z). Thus, the welding strength of the first stacked layer laminated on the metal substrate 2 and the second stacked layers laminated on each other and on the first stacked layer is improved.

Figure 8:
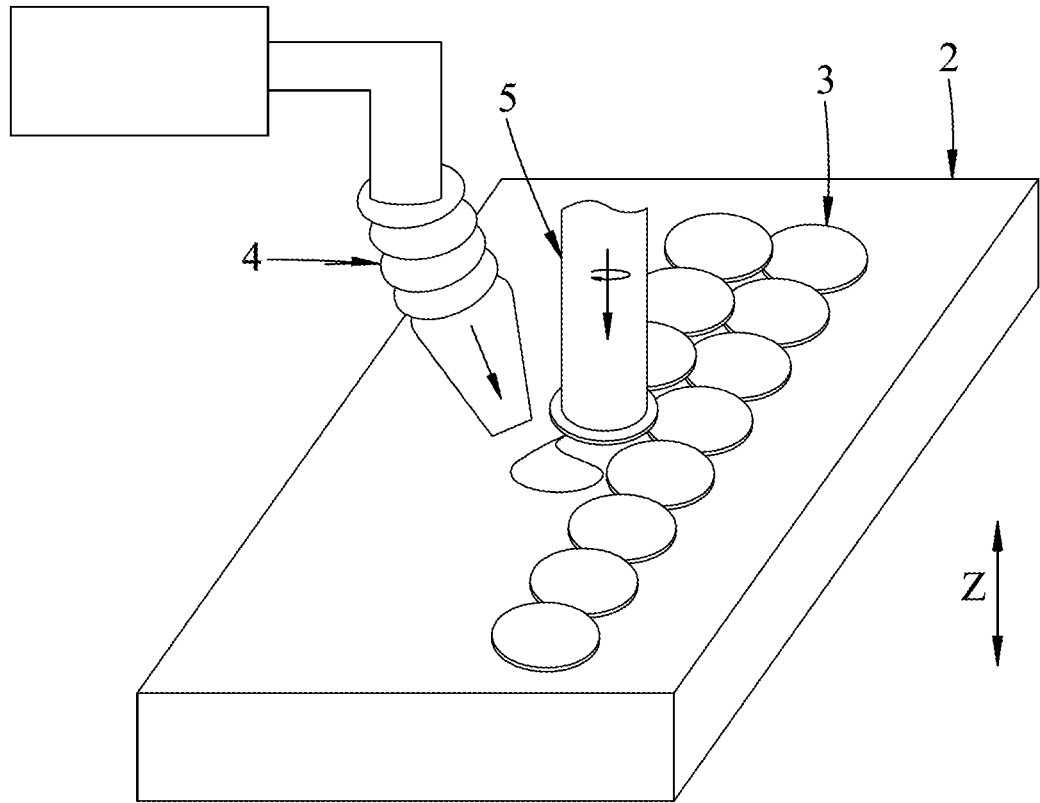
FIG. 8 is a perspective view illustrating a modification of the first and second metal parts of the embodiment.

Referring to FIG. 8, in one form, each of the first and second metal parts 3 is made of a metal paste.

Figure 9:
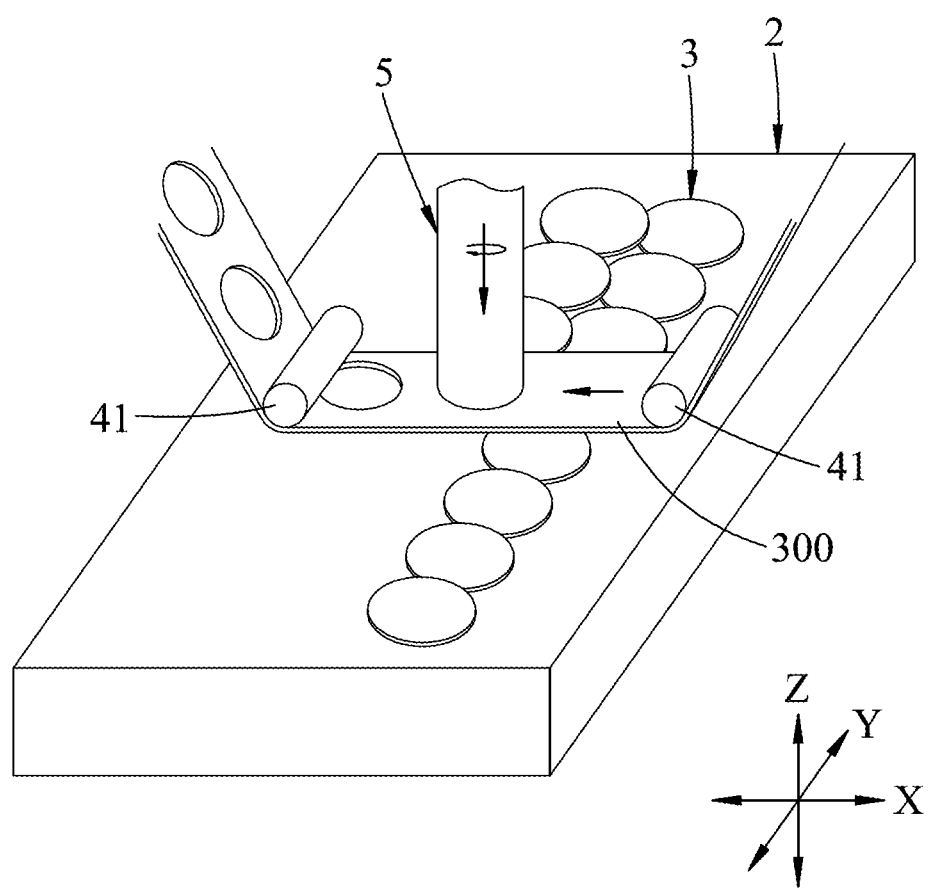
FIG. 9 is a perspective view illustrating a modification of the embodiment.
Figure 10:
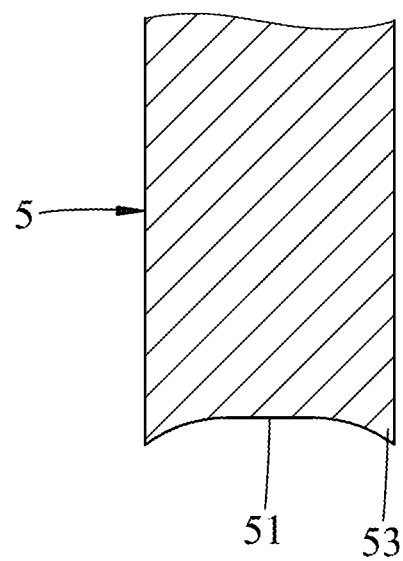
FIG. 10 is a fragmentary schematic view illustrating a modification of the welding unit adapted to be used in the modification of the embodiment of FIG. 9.

Referring to FIGS. 9 and 10, another modification of the embodiment of the additive manufacturing method is illustrated. In the another modification, the additive manufacturing method further includes continuously feeding a flattened metal strip 300 to the metal substrate 2 using the feeding unit 4 (not shown in FIG. 9), and sequentially cutting from the flattened metal strip 300 the first metal parts 3 to be disposed on the metal substrate 2 using the welding unit 5 during the formation of the first stacked layer. The disposing operation of the second metal parts 3' may be carried out in the same manner during formation of the second stacked layers. The feeding unit 4 is exemplified to be a roll-to-roll assembly, and includes a supply roll (not shown), a take-up roll (not shown) that is spaced apart from the supply roll, and two spaced-apart guiding rods 41 located downstream of the supply roll and upstream of the take-up roll, respectively. To be specific, the metal strip 300 is reeled on the supply roll and has an end fixedly connected to the take-up roll. The metal strip 300 is flattened between the guiding rods 41 and extends along a longitudinal direction (X) perpendicular to the longitudinal axis (z). The feeding unit 4 combined with the metal strip 300 and the welding unit 5 is movable relative to the metal substrate 2. The welding unit 5 further includes a cutting portion 53 at a periphery of the pushing surface 51 for performing the cutting operation of the first and second metal parts 3, 3'. As shown in FIG. 9, the metal strip 300 is movable relative to the metal substrate 2 along a direction (Y) that is perpendicular to the longitudinal direction (X). The supply roll may be driven by a motor and a gear unit, which are well known to those skilled in the art, thus further details thereof are not provided herein for the sake of brevity.

To sum up, by virtue of forming the first stacked layer metal parts 3 on the metal substrate 2 and additively forming the second stacked layers on the first stacked layer through friction welding of the welding unit 5, the final 3D article 30 can be obtained using an energy-saving approach.

In the description above, for the purposes of explanation, numerous specific details have been set forth in order to provide a thorough understanding of the embodiment. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An additive manufacturing method, comprising:
    (a) providing a metal substrate for disposing a plurality of first metal parts;
    (b) disposing one of the first metal parts on the metal substrate using a feeding unit movable relative to the metal substrate;
    (c) pressing the one of the first metal parts using a welding unit that has a longitudinal axis and rotates about the longitudinal axis to make a pushing surface of the welding unit abut against a pressured surface of the one of the first metal parts opposite to the metal substrate and the one of the first metal parts be welded on the metal substrate through plastic deformation of a first joint zone between the metal substrate and the one of the first metal parts which results from heat generated by friction between the pressured surface of the one of the first metal parts and the pushing surface of the welding unit;

(d) repeating Steps (b) and (c) until a remainder of the first metal parts are welded on the metal substrate to form a first stacked layer laminated on the metal substrate;

(e) disposing one of second metal parts on the first stacked layer using the feeding unit;

(f) pressing the one of the second metal parts using the welding unit rotating about the longitudinal axis to make the pushing surface of the welding unit abut against a pressured surface of the one of the second metal parts facing away from the first stacked layer and the one of the second metal parts be welded on the first stacked layer through plastic deformation of a second joint zone between the first stacked layer and the one of the second metal parts which results from heat generated by friction between the pressured surface of the one of the second metal parts and the pushing surface of the welding unit;

(g) repeating Steps (e) and (f) until a remainder of the second metal parts are welded on the first stacked layer to form a second stacked layer laminated on the first stacked layer; and (h) repeating Step (g) until a required amount of the second stacked layers are additively laminated on the first stacked layer to obtain a final three-dimensional (3D) article wherein the method further comprise:
continuously feeding a flattened metal strip to the metal substrate using the feeding unit, and
sequentially cutting from the flattened metal strip the first metal parts to be disposed on the metal substrate using a cutting portion of the welding unit during formation of the first stacked layer.

2. The method of claim 1, further comprising:
after the first stacked layer is formed, pressing a top surface of the first stacked layer opposite to the metal substrate using the welding unit rotating about the longitudinal axis and moving the welding unit along a first reinforcing path on the first stacked layer, the first reinforcing path passing through joint portions of the first stacked layer, each of the joint portions being formed between two adjacent ones of the first metal parts, and through a periphery of the first stacked layer.

3. The method of claim 1, further comprising:
after each of the second stacked layers is formed, pressing a top surface of the second stacked layer facing away from the first stacked layer using the welding unit rotating about the longitudinal axis and moving the welding unit along a second reinforcing path on the second stacked layer, the second reinforcing path passing through joint portions of the second stacked layer, each of the joint portions being formed between two adjacent ones of the second metal parts, and through a periphery of the second stacked layer.

4. The method of claim 1, wherein each of the first and second metal parts is circular.

5. The method of claim 1, wherein each of the first and second metal parts has a thickness measured along the longitudinal axis of less than 4 mm and greater than 0.5 mm.

6. The method of claim 4, wherein the welding unit further includes a probe protruding from the pushing surface along the longitudinal axis and having a height measured along the axis greater than a thickness of each of the first and second metal parts.

7. The method of claim 1, wherein each of the first and second metal parts is made of a metal paste.

8. The method of claim 1, further comprising after the first and second stacked layers are formed, trimming the first and second stacked layers.

9. The method of claim 1, wherein each of the first and second metal parts is made from a metallic material that has a melting point not higher than 1500° C. and that is selected from a metal, an alloy and a metal-containing composite.

10. The method of claim 9, wherein the metallic material is selected from the group consisting of steel, a copper-based alloy, an aluminum-based alloy, a magnesium-based alloy, a nickel-based alloy and combinations thereof.

11. The method of claim 1, wherein the cutting portion is at a periphery of the pushing surface of the welding unit for performing the cutting operation of the first and second metal parts.

12. The method of claim 1, further comprising sequentially cutting from the flattened metal strip of the second metal parts to be disposed on the first stacked layer using the cutting portion of the welding unit during the formation of the second stacked layers.

* * * * *